L. DODGE.

Baling-Presses.

No. 6,242. Reissued Jan. 19, 1875.

Witnesses.

Emmett Dick

Wm. E. Chaffee

Inventor.

Levi Dodge by Atty A. Pollock

UNITED STATES PATENT OFFICE.

LEVI DODGE, OF WATERFORD, NEW YORK.

IMPROVEMENT IN BALING-PRESSES.

Specification forming part of Letters Patent No. 120,048, dated October 17, 1871; reissue No. 6,242, dated January 19, 1875; application filed January 4, 1875.

*To all whom it may concern:*

Be it known that I, LEVI DODGE, of Waterford, in the county of Saratoga and State of New York, have invented certain new and useful Improvements in Baling-Presses, of which the following is a specification:

My invention relates to presses for baling hay, straw, cotton, and other materials which require to be compressed into compact bales. The distinctive feature of the apparatus, which distinguishes it from all others heretofore used for like purposes, is that the hay or other material is progressively fed and compressed in small quantities at a time in the bale-forming cylinder or case, until the bale has been gradually built up and formed.

The press in which my improvements are comprised contains three principal parts, in the combination of which my invention mainly consists. These parts are as follows: First, a cylinder or case in which the bale is formed; second, compressing devices which compress in the cylinder or case successive portions of the hay or other material; third, a platform or support upon which the bale, while being formed, will rest, said support and the compressing devices being so arranged that the one may have a motion away from the other to permit the introduction into the cylinder or case and between them of fresh portions of the material to be baled, this motion being so graduated or regulated as not to take place until the material already between the support and the compressing devices has been subjected to the required degree of pressure.

To enable those skilled in the art to understand these and other features of my invention, I will now proceed to describe the manner in which the same is or may be carried into effect by reference to the accompanying drawing, in which—

Figure 1:
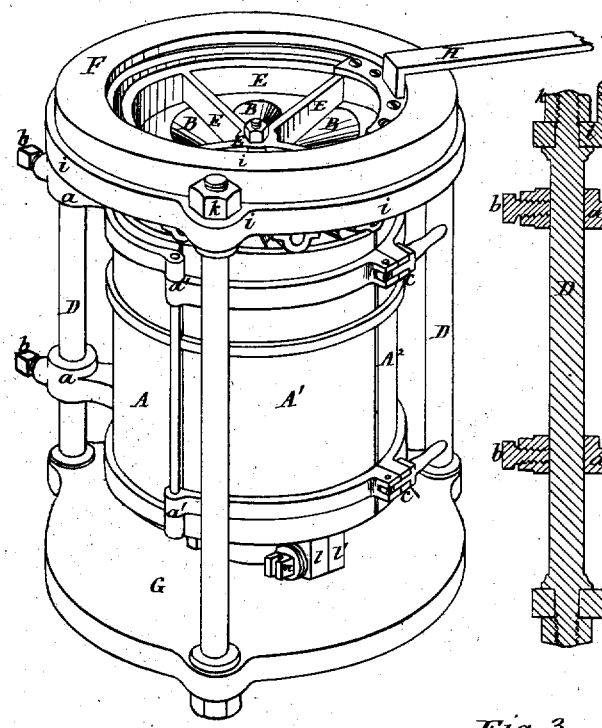
Figure 2:
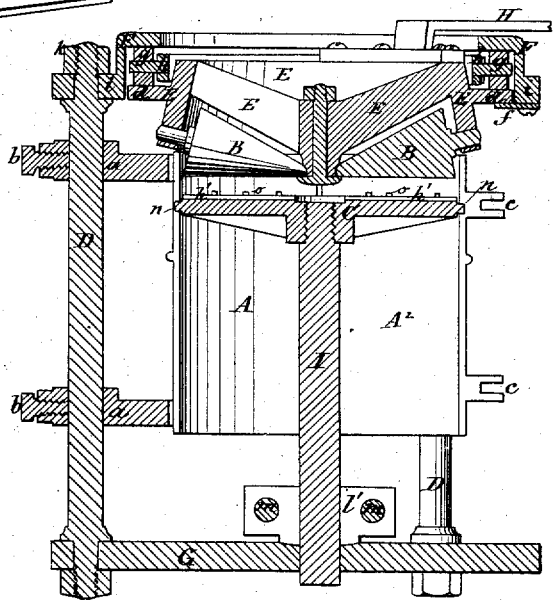
Figure 3:
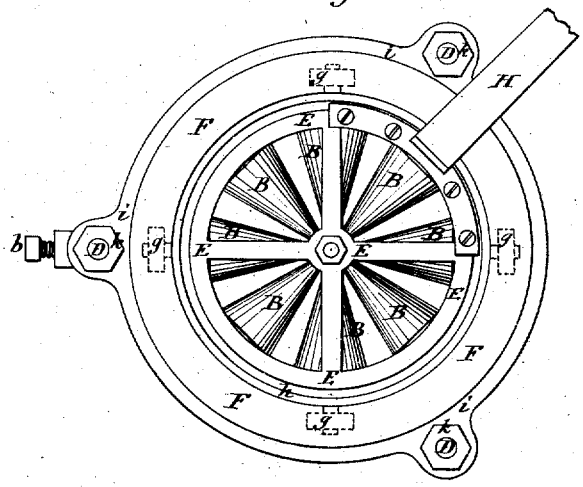

Figure 1 is a perspective view of a baling-press made in accordance with my invention. Fig. 2 is a vertical central section of the same. Fig. 3 is a top view of the same.

The three principal portions of the apparatus are represented by A B C, A being the cylinder or case in which the bale is formed; B, the compressing device, and C the platform or support upon which the bale rests while in process of formation. I shall describe these parts in the order named. The case A is open at the top and bottom and of a cylindrical form, in order to enable the special compressing devices herein shown to operate perfectly. Its form may be varied from that of a cylinder; but the latter shape is the one that I prefer to use, and that will be found entirely practicable, and the best, on all accounts, for the purpose for which the case is designed.

This case may rest on any suitable foundation, and may be stayed and maintained in place by any suitable means. The means I have represented in the drawing consists of two eyes or tubular projections, *a*, which fit upon a column, D, forming one of three uprights upon which the feeding devices are supported, as hereinafter described. The eyes *a* can slide up and down on the column, so as to adjust the case up and down with relation to the feeding devices, and are held at any desired point on the column by means of set-screws *b*. It is necessary that the case should be so arranged as to allow access to the bale after it has been formed, both for the purpose of binding it and to allow it to be removed from the press, and to this end I make one half of the cylinder to consist of two doors, $A^1$ $A^2$, each hinged to the other half of the cylinder, as shown at *a'*, provided at their contiguous or adjoining edges with cam-fastenings *c*, or other suitable means for latching or holding them tightly together.

When the bale has been formed the cam-fastenings can be lifted or unlatched, and the doors are then free to be thrown open to permit access to the interior of the cylinder. I do not, however, limit myself to this specific arrangement, as the case may be arranged in other ways to permit the binding and removal of the bale.

The compressing devices consist, in this instance, of a series of conical rollers, B, arranged in a circular skeleton frame, E, from the center of which they radiate, and in which they are supported in suitable bearings so as to be free to revolve upon their axes. The diameter of the roller-frame is about the same as that of the cylinder, and the rollers are so arranged that their lower portions will come within the cylinder and lie in a plane about parallel with the platform or support herein.

after described. The roller-supporting frame E is arranged to have a rotary movement on the axis of the cylinder, of which motion the rollers, of course, partake. It is for this purpose provided with an annular flange, *d*, which fits in the under side of a ring, F, and is there held by means of metallic plates *f*, screwed to the under side of ring F and overlapping the flange *d*, as seen in Fig. 2. In order to lessen the friction which would otherwise arise between the top of the ring and the flange *d* the recess in the ring is made large enough to receive friction-rollers *g*, which are kept in their proper places by being mounted on pins projecting from a loose ring, *h*, as shown in Fig. 2. The ring F is held down against the upward pressure of the rollers and their frame by means of a flange, *i*, on its periphery, which is provided with tubular sockets fitting over the screw-threaded upper ends of columns D, upon which are screw-nuts K, which serve to hold the ring in place, and at the same time can be removed to permit the ring, together with the devices which it carries, to be lifted away from the cylinder and removed from the apparatus. The columns D may be secured to any suitable foundation. In this case they rest upon and are fastened to a base-plate, G. The annular roller-supporting frame is rotated by means of a handle, H, or gearing, or other suitable means, and can be driven by horse or other power. Under the arrangement described the rollers are supported at each of their ends, and their outer ends bear against the ring F, and they therefore exercise an equable pressure upon the material within the cylinder without danger of straining or throwing out of place their supporting-frame.

In operating the machine, after the roller-supporting frame has been put in revolution, the hay, straw, or other substance to be baled is fed to the rollers through a hopper or otherwise, and by their action is first carried into the cylinder through the spaces intervening between them, and then compressed down upon the platform or support C. The rollers may be otherwise arranged for this purpose, however, and, in lieu of rollers, other compressing devices may be employed, all that is necessary being that the movement of devices should have the effect to compress successive portions of the material in the cylinder until the bale is gradually built up and formed.

The platform or support upon which the bale rests during its process of formation is shown at C. It is necessary that this platform or support and the compressing devices should be so arranged that one of them may have a motion away from the other, to permit the gradual building up of the bale by the introduction of successive portions of the hay or other material to the cylinder. In the apparatus shown in the drawing the platform is made movable for this purpose. It is mounted upon the end of a shaft or rod, I, the lower end of which passes through a friction-collar supported on or attached to the base-plate G, consisting of two semi-cylindrical sections, *l l'*, surrounding the shaft, and held together by screw-bolts *m*, by tightening or loosening which any desired pressure upon the shaft may be maintained, so that, until the pressure of the rolls upon the material within the case and upon the platform C exceeds that of the collar upon the shaft the latter will uphold the platform. Thus the material may be compressed to any desired degree, and in proportion as this is reached the platform will descend, in this way effecting the gradual but continuous building up of the bale by the compression of successive portions or layers of the material. In lieu of the friction-collar, weights, springs, or other well-known devices for counterbalancing the pressure of the rolls may be employed. It will also be apparent that the platform might be made stationary, in which case it would form the bottom of the cylinder, and that the feeding devices might have a motion toward and away from the same, the motion away from the platform being regulated by weights or friction, as in the other case, so as to take place only when the pressure upon the material in the cylinder should exceed a certain limit. For instance, a shaft might extend up from the top of the center of the frame E, engaging by means of a feather with a stationary gear, so that it, together with the frame carried by it, might be free to slide up and down while receiving a rotary movement from the gear.

The platform is prevented from accidentally rotating while the press is in operation by means of one or more feathers, *n*, fitting in grooves or slots in the cylinder. It is also provided with projections *o* on its face, to prevent the bale from being twisted around bodily, and with one or more grooves or scores, *h'*, extending across it, to permit the passage of the wire or other device used to bind the bale. Any suitable support for the bale may be used, all that is needed being that said bale while forming should have for its support a base that will offer the needed resistance to secure proper compression.

The operation of the apparatus has already been sufficiently explained in the foregoing description of the several parts of the apparatus.

Having now described my invention, and the manner in which the same is or may be carried into effect, what I claim, and desire to secure by Letters Patent, is as follows:

1. A machine for baling hay, straw, cotton, and other material, in which the following elements are combined, substantially as herein shown and set forth: First, a case in which the bale is formed as described; second, compressing devices which compress successive portions of the hay or other material in the cylinder or case until the bale is formed as described; third, a platform or support, substantially as described, upon which the bale during the process of its formation, rests, said platform and the compressing devices being arranged substantially as stated, so that the one may have a motion away from the other in proportion as the bale is built up.

2. The combination, with the cylinder or other case in which the bale is formed, and the devices by means of which successive portions of the material to be baled are compressed in said cylinder or case, of a sliding base or support for the bale, arranged substantially as shown and described, to offer a yielding resistance to the compressing devices, and to move away from the said devices as successive parts of the bale are formed and compressed.

3. The combination of the feed and compressing rollers, and their skeleton supporting-frame, with the ring in which said frame is held and moves, and the devices interposed between the ring and frame for reducing friction, substantially as shown and set forth.

4. In a baling-press, constructed and operating substantially as described, the bale-forming cylinder or case, in combination with devices for its adjustment up and down with relation to the feeding and compressing devices, as shown and set forth.

5. The combination and arrangement of the cylinder, the platform, and the feeding and compressing devices, with the surrounding frame by which they are carried, substantially as herein shown and set forth.

In testimony whereof I have hereunto signed my name this 14th day of December, A. D. 1874.

LEVI DODGE.

Witnesses:

EWELL A. DICK,
HENRY R. ELLIOTT.